US005164795A

United States Patent [19]

Conway

[11] Patent Number: 5,164,795

[45] Date of Patent: Nov. 17, 1992

[54] METHOD AND APPARATUS FOR GRADING FRUIT

[75] Inventor: Tim D. Conway, Stockton, Calif.

[73] Assignee: Sunkist Growers, Inc., Sherman Oaks, Calif.

[21] Appl. No.: 498,354

[22] Filed: Mar. 23, 1990

[51] Int. Cl.[5] .................... G01J 3/51

[52] U.S. Cl. .................... 356/407; 250/226; 356/418; 356/425; 358/106

[58] Field of Search .................... 356/73, 385, 402, 406, 356/407, 416, 418, 419, 425; 250/226; 358/106; 209/577, 580–582, 587

[56] References Cited

U.S. PATENT DOCUMENTS

| | | | |
|---|---|---|---|
| Re. 29,031 | 11/1976 | Irving et al. . | |
| 3,016,788 | 1/1962 | Smith . | |
| 3,206,022 | 9/1965 | Roberts et al. . | |
| 3,289,832 | 12/1966 | Ramsey . | |
| 3,393,800 | 7/1968 | Durand Jr. . | |
| 3,580,380 | 5/1971 | Phillips . | |
| 3,765,775 | 10/1973 | Ganssle et al. . | |
| 3,963,351 | 6/1976 | Chance et al. | 250/227 |
| 4,120,402 | 10/1978 | Swanson | 209/580 |
| 4,131,540 | 12/1978 | Husome et al. | 209/582 |
| 4,132,314 | 1/1979 | von Beckmann et al. | 209/565 |
| 4,204,950 | 5/1980 | Burford Jr. | 209/558 |
| 4,205,752 | 6/1980 | Malvick et al. | 209/564 |
| 4,308,959 | 1/1982 | Hoover et al. | 358/106 |
| 4,369,886 | 1/1983 | Lane et al. | 209/564 |
| 4,376,951 | 3/1983 | Miyazawa | 358/106 |
| 4,486,775 | 12/1984 | Catlow | 358/106 |
| 4,494,875 | 1/1985 | Schramm et al. | 356/402 |
| 4,534,470 | 8/1985 | Mills | 209/585 |
| 4,645,080 | 2/1987 | Scopatz | 209/558 |
| 4,726,898 | 2/1988 | Mills et al. | 209/587 |
| 4,825,068 | 4/1989 | Suzuki et al. | 250/226 |

FOREIGN PATENT DOCUMENTS

| | | | |
|---|---|---|---|
| WO8908510 | 9/1989 | PCT Int'l Appl. | 209/587 |

*Primary Examiner*—F. L. Evans
*Attorney, Agent, or Firm*—Stephen J. Koundakjian; James R. Brueggemann; Paul V. del Giudice

[57] ABSTRACT

A method and apparatus is disclosed for grading the surface of generally apherical fruit according to surface characteristics such as color and blemish. The fruit are moved in single file past a scanning camera while being rotated about a transverse horizontal axis. Reflectivity data in three separate wavelength bands is collected for a series of scans of each article of fruit, and this data is processed to eliminate all duplicative data arising from the fruit's rotation. Color ratio signals based on the remaining reflectivity data are then utilized to grade the fruit according to their surface color and degree of blemish.

23 Claims, 6 Drawing Sheets

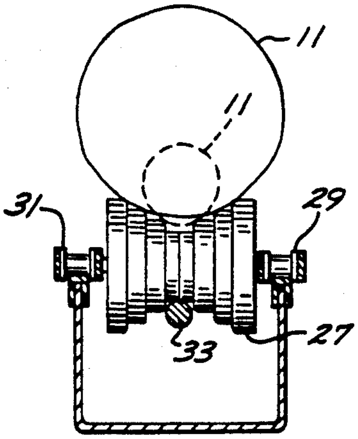
FIG. 3
FIG. 5
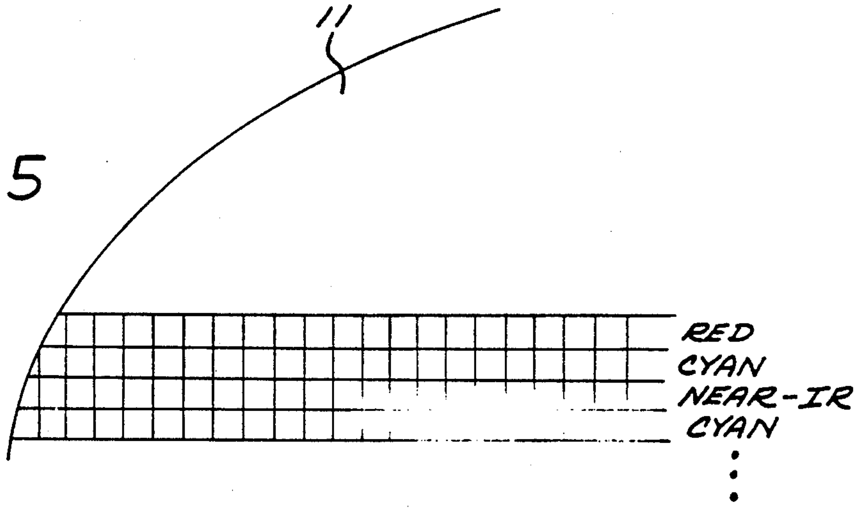
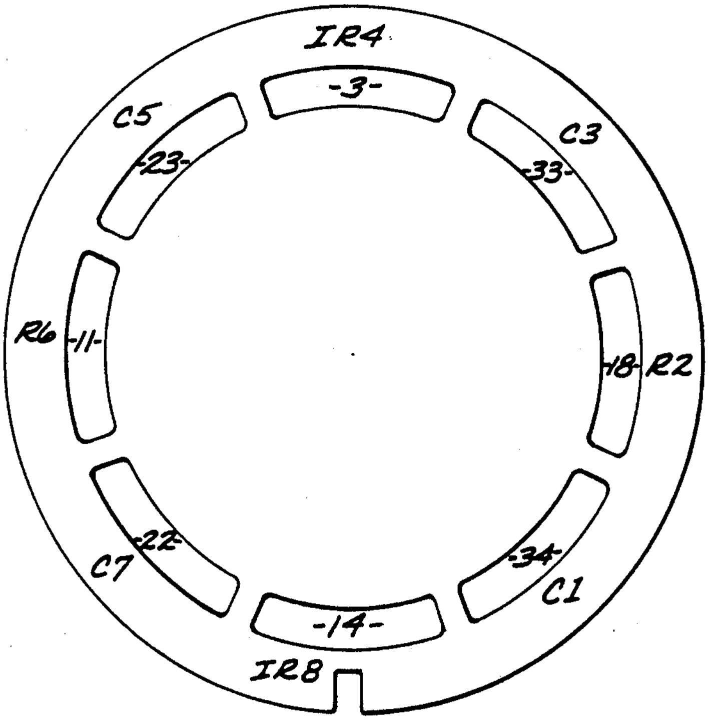
FIG. 6

METHOD AND APPARATUS FOR GRADING FRUIT

BACKGROUND OF THE INVENTION

This invention relates generally to systems for grading fruit according to surface characteristics such as color and, more particularly, to systems that optically scan a succession of fruit moving along a conveyor.

Systems of this particular kind are now in general use in the fresh fruit industry, to grade the fruit according to certain color and blemish categories. The systems provide a significant cost savings over prior manual grading systems and also provide grading that is substantially more reliable and repeatable.

In typical grading systems of this kind, the fruit are moved successively past an array of cameras, which scan the fruit to detect the surface reflectivities of a large number of discrete segmental areas on the surface of each article of fruit. By comparing the reflectivity of each such segmental area with that of neighboring areas and by analyzing the color spectrum of the light received from each such area, the degree of blemish and the average color for each article of fruit can be ascertained.

Some of the grading systems of this kind have utilized just a single camera, with a conveyor that spins the fruit as they are moved past the camera. Such systems are not considered entirely effective, however, because to bring the entire surface of relatively large fruit into the camera's field of view requires a spin rate so high that the fruit can bounce on the conveyor and thereby prevent accurate grading. Thus, effective grading is generally considered to require multiple cameras.

Multiple-camera grading systems described briefly above have proven to be generally satisfactory in providing fairly accurate measures of surface blemishes and surface color for many kinds of fruit. However, the systems are believed to be in many ways unduly complex and are believed to be unduly limited in the kinds of blemishes and color variations that can be detected. There is a continuing need for simplified grading apparatus, and related method, that can grade fruit even more effectively into a wide variety of blemish and color categories. The present invention fulfills this need.

SUMMARY OF THE INVENTION

The present invention is embodied in an apparatus, and related method, for scanning substantially the entire surfaces of a succession of generally spherical grade. More particularly, the apparatus includes conveyor means for advancing the succession of fruit, and camera means for repeatedly scanning the advancing fruit along a scan axis transverse to the conveyor axis and for generating surface reflectivity data for each article. The conveyor means includes means for rotating the advancing fruit about a horizontal axis transverse to the conveyor axis to allow the camera means to generate surface reflectivity data for substantially the entire surface of each article of fruit. In accordance with the invention, selection means also are included for determining the approximate diameter of each article of fruit and, based on that determination, ascertaining what portion, if any, of the surface reflectivity data is duplicative of other surface reflectivity data and discarding that duplicative data, with the remaining data representing substantially the entire surface for that particular article of fruit.

In a more detailed feature of the invention, the camera means includes first and second photodetector arrays, each for repeatedly scanning the advancing fruit along a separate scan axis transverse to the conveyor axis, such that each photodetector array generates reflectivity data for a separate surface portion of each article of fruit. The two surface portions overlap each other and together include substantially the entire surface of each article of fruit. In addition, the selection means includes means for combining the reflectivity data from the first and second photodetector arrays while discarding the duplicative portion of the data that represents the overlap of the two surface portions. The selection means, conveniently, can determine what portions of the combined reflectivity data are duplicative based on a diameter determination, which in turn can be made by counting the number of scans accumulated for each article of fruit.

In another feature of the invention, the conveyor means includes a succession of transverse rollers, with separate article's of fruit being carried in pockets defined between the rollers. Means are provided for rotating the rollers so as to rotate the successive articles of fruit at a rate such that the first and second photodetector arrays together scan the entire surface of each article of fruit, regardless of its diameter.

In a separate and independent feature of the invention, the camera means produces reflectivity measurements in three or more wavelength bands for each of a large number of distinct areas on the surface of each article of fruit. Ratio means are provided for computing two reflectivity ratios for each such area, each ratio representing a ratio of two different reflectivity measurements for the distinct area. Color grading means also are provided, for assigning a color grade to each of the plurality of distinct areas based on the two reflectivity ratios for that area. The color grading means also combines the assigned color grades for all of the distinct areas so as to provide an overall color grading for each article of fruit. The three wavelength bands preferably include red, near-infrared and green wavelengths. The camera means scans the fruit in a series of substantially parallel scan rows, with the reflectivity measurements produced for each scan row representing just a single wavelength band. The reflectivity measurements for each distinct area on the surface are derived from three or more adjacent scan rows. The camera means advantageously can include a plurality of color filters, and means for moving the filters individually between the fruit and an adjacent linear photodetector array, with a separate set of reflectivity data being read out of the array each time a separate filter is positioned in front of it.

Other features and advantages of the present invention should become apparent from the following description of the preferred embodiment, taken in conjunction with the accompanying drawings, which illustrate, by way of example, the principles of the invention.

BRIEF DESCRIPTION OF THE DRAWINGS

FIG. 3 is an elevational view of one roller of the conveyor of FIGS. 1 and 2, taken substantially in the direction of the arrows 3—3 in FIG. 2, and showing two differently-sized fruit alternatively positioned on the roller.

FIG. 5 is a plan view of a color filter wheel included in the fruit grading apparatus of FIG. 2.

FIG. 6 is a schematic diagram of an enlarged portion of an article of fruit, showing parts of four successive scans of the fruit by one of the two photodetector arrays in the fruit grading apparatus of FIG. 1.

DESCRIPTION OF THE PREFERRED EMBODIMENT

Figure 1:
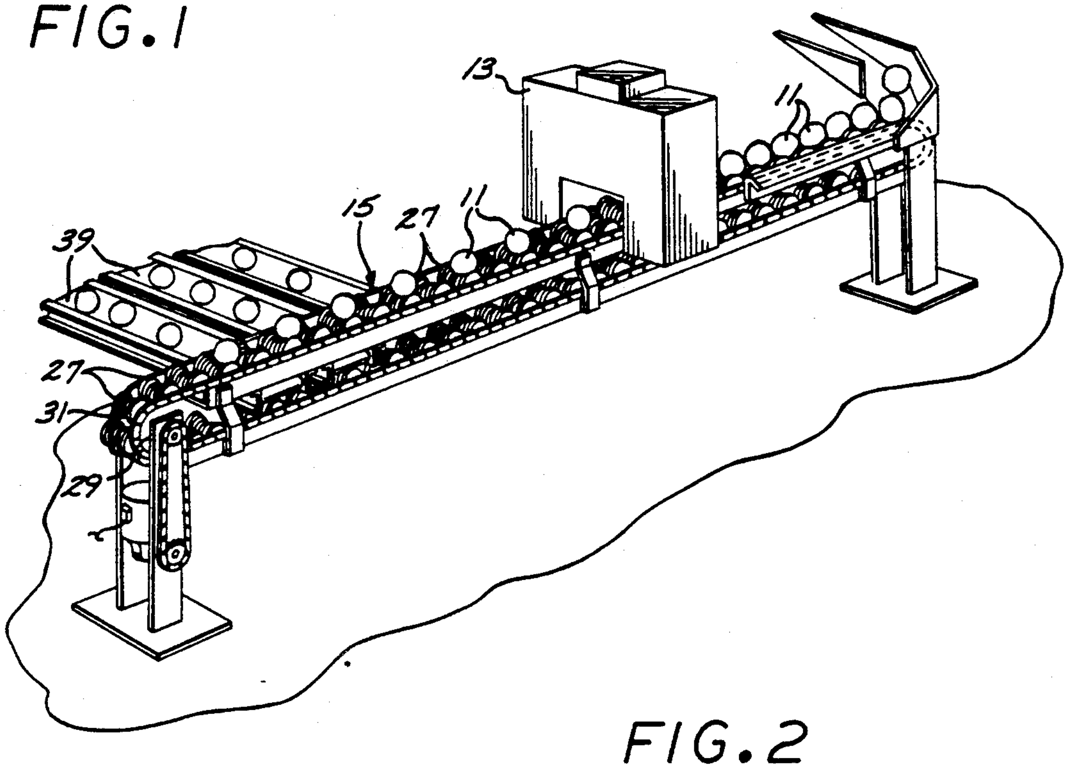
FIG. 1 is a perspective view of a fruit grading apparatus that optically scans a succession of spherical fruit being transported along a conveyor.

With reference now to the exemplary drawings, and particularly to FIG. 1, there is shown an apparatus for optically scanning a succession of generally spherical fruit 11, e.g., citrus, and grading the fruit according to detected surface color and blemishes. The apparatus includes an overhead camera assembly 13 for optically scanning the fruit as they are transported in single file by a conveyor 15. The camera assembly includes two cameras 17 and 19 spaced along the length of the conveyor, each camera including a linear array of photodetectors 21 or 23, respectively, positioned to receive light from a narrow swath across the upwardly-facing surface of the advancing fruit. Data from the two photodetector arrays are periodically read out and supplied to a microprocessor 25, which accumulates the reflectivity data for a large number of successive scans of each article of fruit. As will be described below, this data is appropriately analyzed to grade each article of fruit according to its detected surface color and surface blemishes.

The conveyor 15 includes a series of transverse rollers 27 connected together at their opposite ends by endless chains 29 and 31. The rollers each have a generally hourglass shape, as shown in FIG. 3, such that a separate pocket is formed between each adjacent pair of rollers. Each such pocket supports a separate article of fruit.

Figure 2:
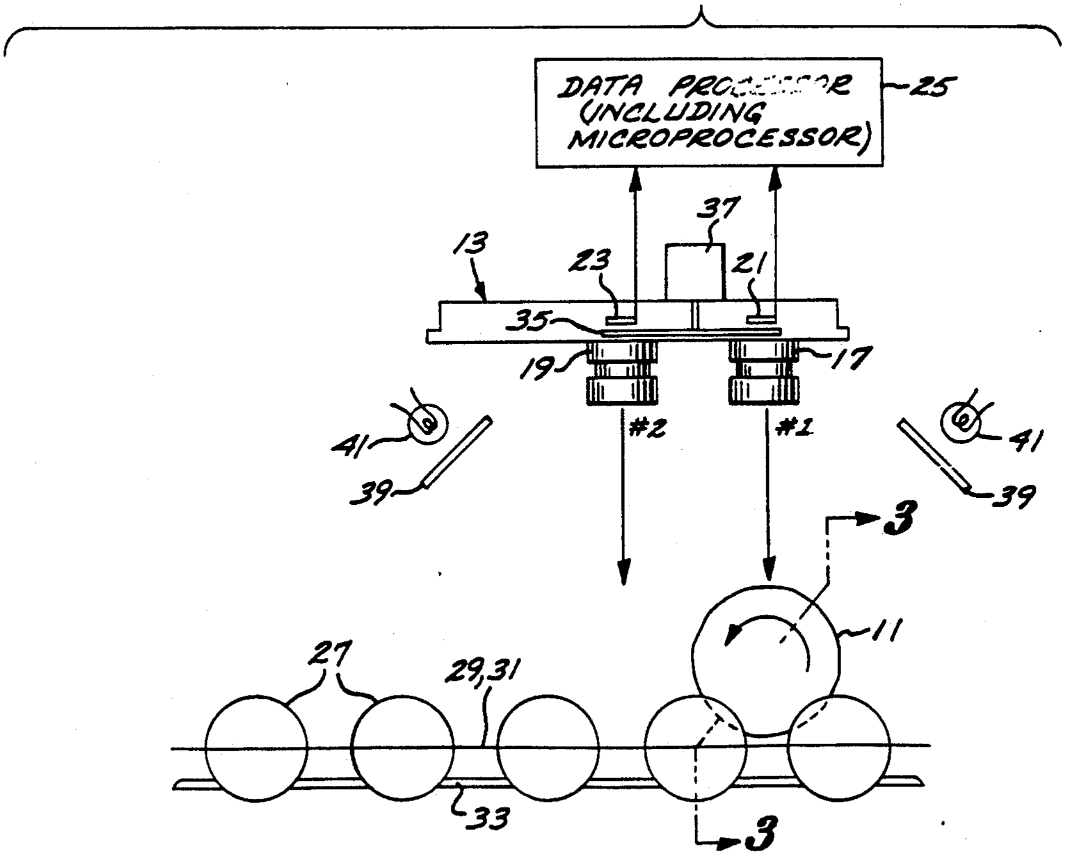
FIG. 2 is a schematic side elevational view of the fruit grading apparatus of FIG. 1.

As the conveyor 15 is moved, from right to left in FIGS. 1 and 2, its individual rollers 27 are made to rotate in a reverse, or clockwise direction, at least in the region beneath the camera assembly 13. This rotation can conveniently be provided by positioning a friction belt immediately beneath the rollers. The friction belt is driven by a motor and pulley assembly (not shown) so as to move forwardly at a rate faster than the rate of the conveyor 15, whereby the rollers are induced by friction to roll rearwardly, thereby causing the fruit 11 being transported by the conveyor to roll in their pockets in a forward (i.e., counterclockwise in FIG. 2), direction. As a consequence, both cameras 17 and 19 are enabled to scan more than merely 180 degrees of the surface of each article of fruit. The two cameras are positioned relative to each other such that each scans a different surface portion of each article of fruit, with the two surface portions together including the article's entire exterior surface.

With reference again to FIG. 3, it will be observed that the roller 27 has a generally hourglass shape, with a diameter that varies in steps from a minimum at its midpoint to a maximum at its two ends. A relatively small article of fruit 11, depicted in dotted lines, would be supported by the midportions of the two adjacent rollers that form the pocket for that article of fruit. Conversely, a large article of fruit, depicted in solid lines, will be supported by the larger, end portions of the two rollers that form the pocket for that article of fruit. Small fruit thereby will be rotated at a faster angular rate than are large fruit. Preferably, the rollers are configured such that all expected sizes of fruit rotate through about the same angle during the time each is located within the view of each camera 17 or 19. Since smaller fruit are within the field of view for a relatively shorter time duration, they must be rotated at a faster angular rate than are larger fruit, which are within the field of view for a relatively longer time duration.

Figure 4:
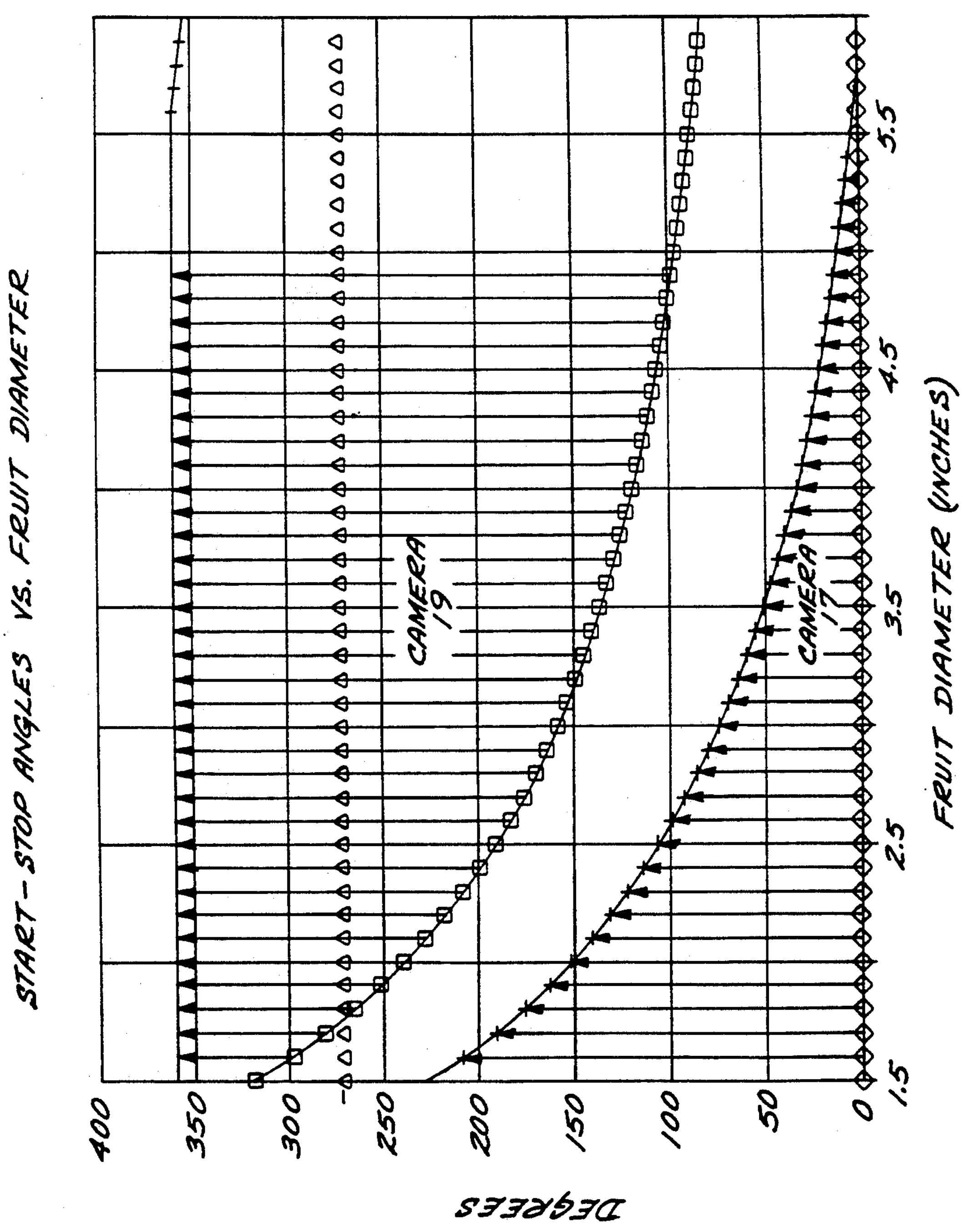
FIG. 4 is a graph depicting the circumferential extent of the fruit surface portions scanned by the two cameras of the fruit grading apparatus of FIG. 1, for a wide range of fruit diameters.

FIG. 4 is a graph showing the rotation angle on each article of fruit 11 that is at some time within the field of view of each camera 17 or 19, for a range of possible fruit diameters. In all cases, i.e., for all possible fruit diameters, the first camera 17 scans about 270 degrees of arc on the surface of each article of fruit, extending over a reference angle range of 0 to 270 degrees. The second camera 19, located several inches downstream from the first camera, likewise scans about 270 degrees of arc on the fruit surface; however, because the fruit are being forwardly rotated as they are being advanced by the conveyer 15 and because relatively small fruit are rotated angularly faster than are relatively large fruit, the particular 270 degrees of arc scanned by the second camera will vary according to fruit diameter. In particular, for fruit having the smallest expected diameter, i.e., about 1.6 inches, the second camera will scan over a reference angle range extending from about 270 degrees to about 180 degrees. This indicates that such small fruit will have rotated 270 degrees in the distance between the first and second cameras. At the other extreme, for fruit having the largest expected diameter, i.e., about 5.5 inches, the second camera will scan the fruit over a reference angle range extending from about 90 degrees to about 360 degrees. This indicates that such large fruit will have rotated through only 90 degrees in the distance between the first and second cameras. In both cases, and in all cases between those two extreme examples, the first and second cameras 17 and 19, together, will scan all 360 degrees of the fruit surface's arc.

With reference to FIGS. 2 and 5, it will be observed that a color filter wheel 35 is positioned immediately beneath the first and second photodetector arrays 21 and 23, respectively. The color filter wheel includes eight red, near-infrared and green optical filters arranged uniformly in a predetermined sequence around the wheel's circumference. A synchronous motor 37 rotates the color wheel at a predetermined rate selected such a different filter is positioned beneath each detector array for each successive scan of the underlying fruit 11. Synchronization between rotation of the color filter and read out of the two photodetector arrays can be readily achieved using conventional techniques. The filter wheel is sized such that diametrically opposite sides of it are always positioned beneath the two photodetector arrays.

The color filters arranged circumferentially on the color filter wheel 35 follow a repeating sequence of red, green, near-infrared, green, red, etc. Thus, as depicted schematically in FIG. 6, successive scans by each of the two photodetector arrays 21 or 23 measure the fruit surface's reflectivity in red, green, near-infrared, green, red, etc. wavelength bands. The number of individual photosensors in each array is preferably on the order of about one hundred, and the number of successive scans for an average-sized article of fruit 11 likewise is preferably on the order of about one hundred. Consequently, many thousands of separate signal values, each for a separate small area on the fruit surface, are generated and stored in the microprocessor 25 (FIG. 2) for each article of fruit.

A common technique for determining the color of a surface subject to variations in the level of luminance across its surface is to use ratios of collected energy in different wavelength bands of the color spectrum. The wavelength bands preferably are selected to provide the greatest range in ratios for the articles being viewed. For citrus fruit, it is important that those ratios be based on wavelengths indicative of varying stages of fruit maturity and of color variations caused by environmental conditions, such as re-greening. The ratios also preferably are based on wavelengths that can be used to distinguish between normally-colored areas and blemished areas. A further consideration in selecting the wavelength bands upon which the color ratios are based is to ensure that sufficient energy is included in each wavelength band for a practical level of illumination, with the resulting signal levels all being on the same order of magnitude. With these design constraints in mind, wavelength bands of green, red and near-infrared are preferred.

A ratio based on surface reflectivity measurements in the red and green wavelength bands can be utilized to distinguish between lighter colored fruit, including bronze through light green lemons and over-color through light green oranges. A ratio based on reflectivity measurements in the near-infrared and green wavelength bands, on the other hand, can be utilized to distinguish between darker colored fruit, such as light green through very dark green lemons and light green through very dark green oranges. A combination of these two color ratios can be used to distinguish between blemished areas and normally-colored areas.

Figure 7:
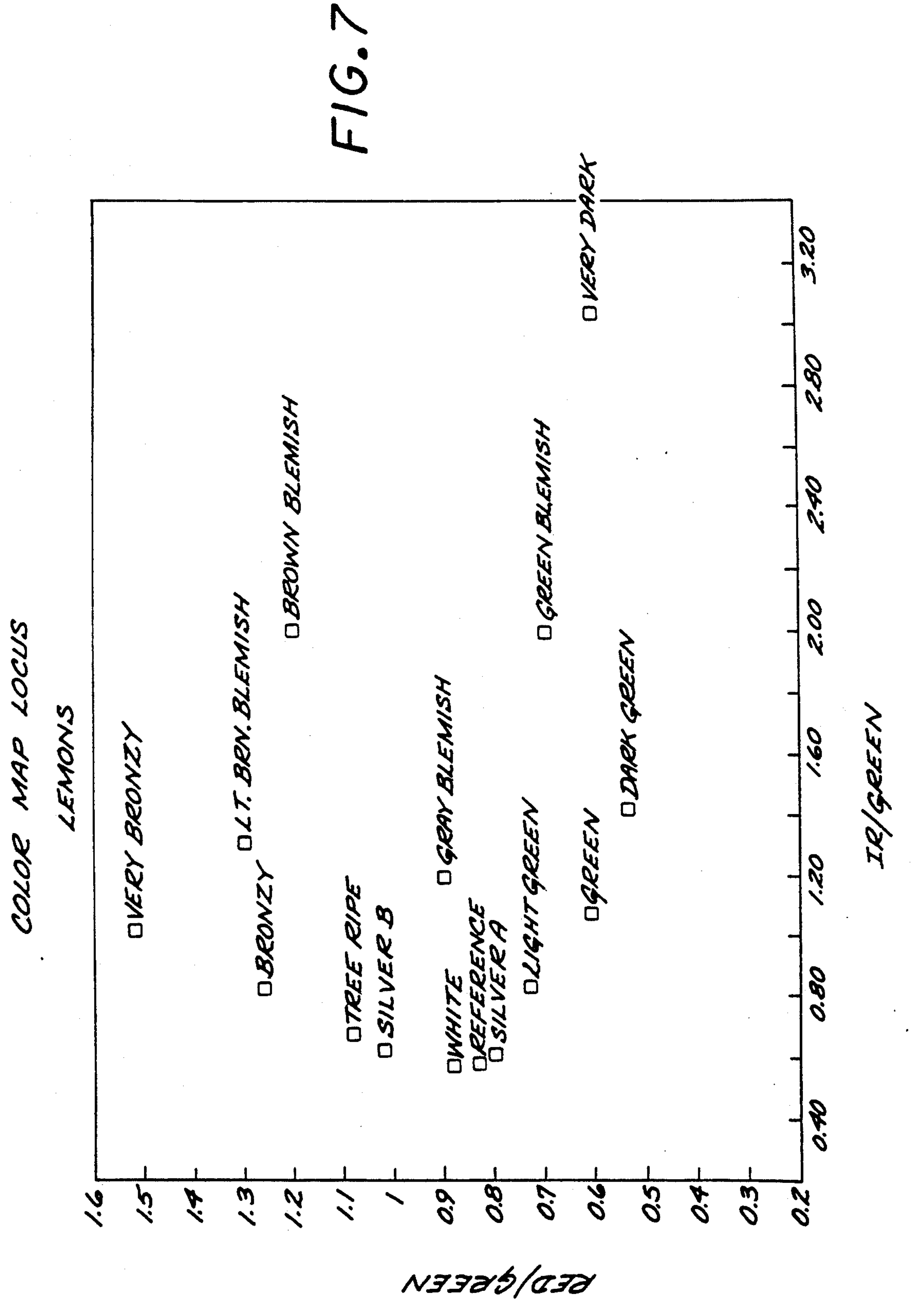
FIG. 7 is a two-dimensional color ratio map showing empirically-determined values for red/green and near-infrared/green color ratios, for the various standardized color categories for lemons.
Figure 8:
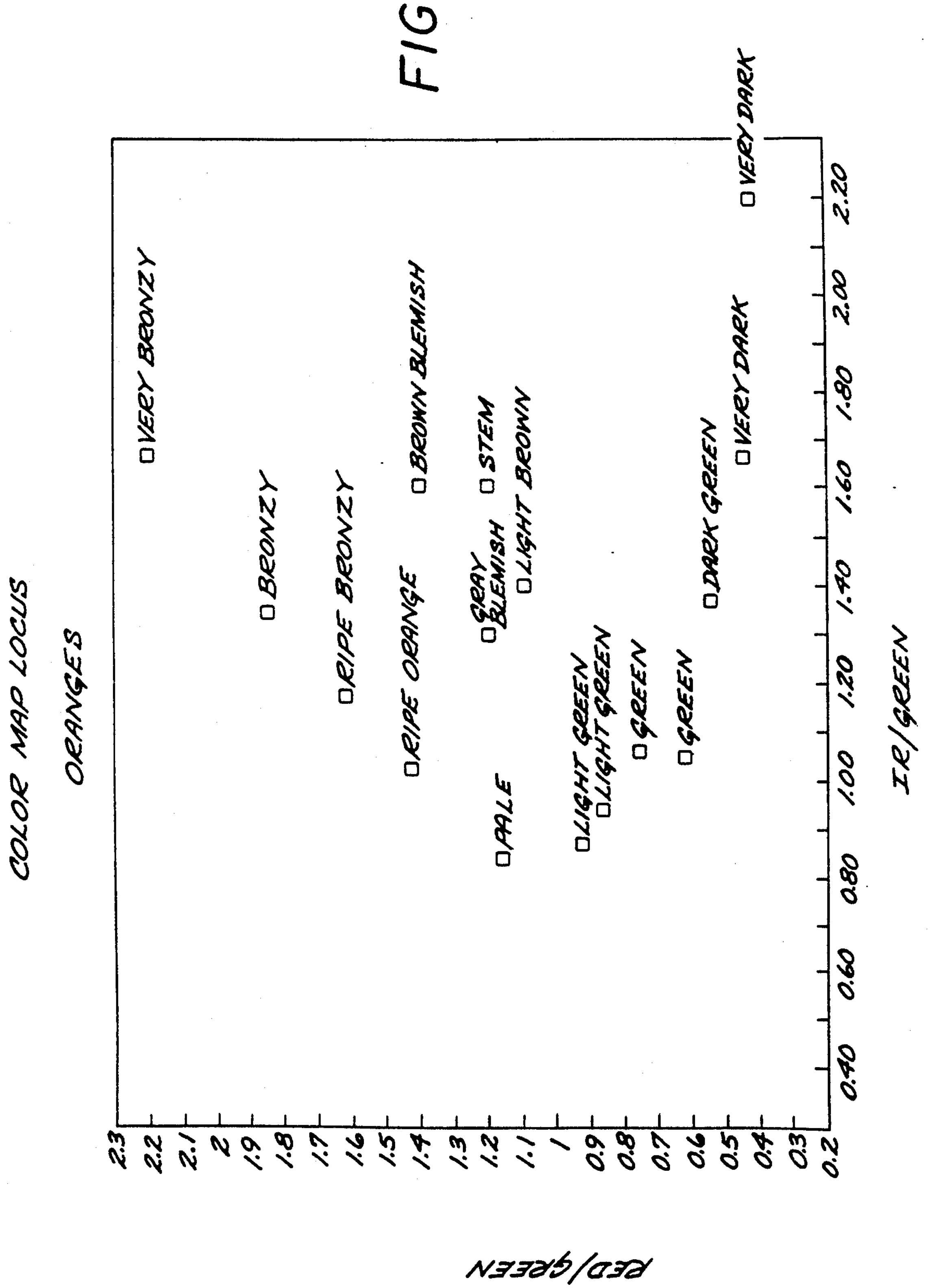
FIG. 8 is a color ratio map similar to FIG. 6, but for oranges rather than lemons.

Use of the red/green and near-infrared/green color ratios to distinguish between the various normally-colored and blemished fruit can be better understood with reference to FIGS. 7 and 8. FIG. 7 is a color ratio map for lemons, and FIG. 8 is a color ratio map for oranges. It will be noted that all of the conventional colors associated with maturing and blemished fruit exhibit certain combinations of red/green and near-infrared/green color ratios, as indicated in the two figures. The color of a particular segmental area on the surface of an article of fruit 11 can thus be determined by comparing the red/green and near-infrared/green color ratios for that particular area with the information set forth on the appropriate color ratio map, i.e., FIG. 7 or FIG. 8. The particular color reference that is closest to that pair of color ratio signals can be assigned to that particular segmental area.

This procedure can be repeated for all of the segmental areas making up the surface of a particular article of fruit 11. Those of ordinary skill in the art will appreciate that this tabulation procedure can be accomplished conveniently using an appropriately-programmed microprocessor. After an appropriate color designation has been assigned to each article of fruit, that fruit can be sorted, for example by appropriately ejecting the article of fruit at an appropriate time onto one of several underlying cross conveyors 39 (FIG. 1).

As previously mentioned, the three wavelength bands preferred for use in analyzing the reflectivity spectra for the fruit 11 are green, red and near-infrared. Thus, the color filter wheel 35 includes appropriate filters designed to transmit these three wavelengths bands. The green filters have a short wave pass band, with a 50% transmission cutoff point at about 595 nanometers, the red filters have a narrow band pass centered at about 665 nanometers, with a bandwidth of about 45 nanometers, and the near-infrared filter has a long wave passband with a 50% cutoff point at about 715 nanometers. The near-infrared filters also are coated, to absorb long wavelength infrared radiation. In addition, heat-absorbing glass 39 is located directly in front of uncoated incandescent light sources 41 that illuminate the fruit being scanned. Polarization coatings on the heat absorbing glass and the camera lenses prevent specular reflection, or glare, from reaching the photodetector arrays 21 and 23.

Figure 9:
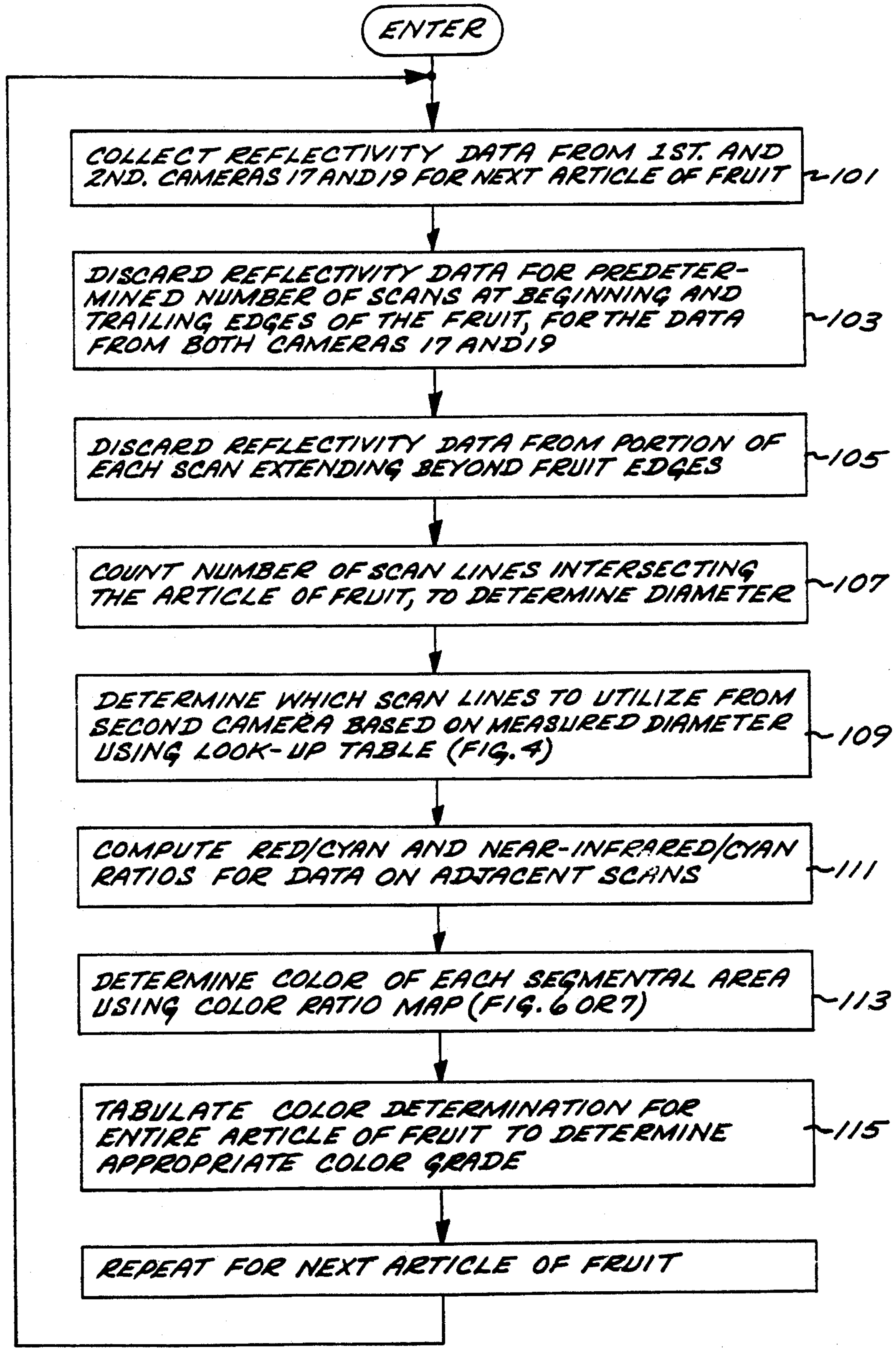
FIG. 9 is a simplified flowchart of the operational steps performed by the microprocessor included in the fruit grading apparatus of FIG. 1, in grading each article of fruit according to its detected surface color and surface blemishes.

FIG. 9 is a simplified flowchart of the operational steps performed by the microprocessor 25 (FIG. 2) in gathering reflectivity data from the first and second cameras 17 and 19, respectively, and appropriately processing that data to determine the proper color grade for each article of fruit 11. In an initial step 101, reflectivity data from the photodetector arrays 21 and 23 of the respective first and second cameras 17 and 19 is digitized and collected for a particular article of fruit 11. This data includes reflectivity measurements in a repeating sequence of red, green, near-infrared and green wavelength bands for successive scan lines and also includes duplicative data representing scans of the same surface portions by the two cameras, as described in detail above.

In a subsequent step 103, the microprocessor 25 discards the reflectivity data for a predetermined number of scans at the beginning and trailing edges of the article of fruit 11. This is done for the data received from both cameras 17 and 19. This data is discarded, because it represents reflectivity measurements made at highly oblique angles, which can lead to at least limited inaccuracies. In a succeeding step 105, data from the beginning and ending portions of each scan line, representing portions of the scan that extend beyond the fruit edges, are discarded. The particular data to discard can be readily determined using conventional techniques such as a mere threshold comparison.

Thereafter, in a step 107, the microprocessor 25 counts the number of scan lines in which one or both cameras 17 and 19 scan actual portions of the article of fruit 11. This indicates the time duration in which the article of fruit is within the camera's field of view, which is directly indicative of the article's diameter. Thereafter, in step 109, the microprocessor determines which particular scan lines to utilize from the data collected from the second camera 19, based on this diameter determination. A lookup table based on the graph of FIG. 4 is utilized for this purpose. This step ensures that the reflectivity data utilized in further processing represents all 360 degrees of the fruit surface, with substantially no overlap.

In a succeeding step 111 the microprocessor 25 computes red/green and near-infrared/green color ratios for the remaining data, in each set of four adjacent rows. These color ratios are then utilized, in a subsequent step 113, to determine the appropriate color for each segmental area on the fruit surface. Reference to data based on the color ratio maps of FIG. 7, in the case of lemons, or FIG. 8, in the case of oranges, can be utilized for this purpose.

Finally, in a step 115, the microprocessor 25 tabulates the color determinations made in step 113 for the individual segmental areas on the fruit surface, to determine an appropriate color grade for the entire article of fruit 11. This final color grade determination can then be utilized in a subsequent sorting process. Following this step 115, the microprocessor returns to the initial step 101, to repeat the entire process for a subsequent article of fruit 11.

It should be appreciated from the foregoing description that the present invention provides an improved apparatus, and related method, for grading the surface of generally spherical fruit. The fruit are moved in single file past a scanning camera while being rotated about a transverse horizontal axis. Reflectivity data in three separate wavelength bands is collected for a series of scans of each article of fruit, and this data is processed to eliminate all duplicative data arising from the fruit's rotation. Color ratio signals based on the remaining reflectivity data are then utilized to grade the fruit according to their surface color and degree of blemish. The apparatus is extremely effective in accurately grading all colors and sizes of fruit in a rapid and reliable fashion.

Although the invention has been described in detail with reference only to the presently preferred embodiment, those of ordinary skill in the art will appreciate that various modifications can be made without departing from the invention. Accordingly, the invention is defined only by the following claims.

I claim:

1. Apparatus for grading the surface of generally spherical fruit, comprising:

conveyor means for advancing a succession of generally spherical fruit along an axis, the fruit having variable average diameters;

camera means for repeatedly scanning the advancing fruit along a scan axis transverse to the conveyor axis and for generating surface reflectivity data for each article of fruit;

wherein the conveyor means includes means for rotating the advancing fruit about a horizontal axis transverse to the conveyor axis as the fruit are advanced past the camera means, such that the camera means generates surface reflectivity data for substantially the entire surface of each article of fruit; and selection means for determining the approximate diameter of each article of fruit and, based on that determination, ascertaining what portion, if any, of the surface reflectivity data is duplicative of other surface reflectivity data and discarding that duplicative data, with the remaining surface reflectivity data representing substantially the entire surface of the article of fruit.

2. Apparatus as defined in claim 1, wherein:

the camera means includes first photodetector means for repeatedly scanning the advancing fruit along a first scan axis transverse to the conveyor axis and for generating reflectivity data for a first surface portion of each article of fruit; and second photodetector means for repeatedly scanning the advancing fruit along a second scan axis transverse to the conveyor axis, spaced from the first scan axis, and for generating reflectivity data for a second surface portion of each article of fruit, wherein the first and second surface portions of each article of fruit overlap each other and together include substantially the entire surface of each article of fruit; and the selection means includes means for combining the reflectivity data generated by the first and second photodetector means while discarding the duplicative portion of data that represents the overlap of the first and second surface portions.

3. Apparatus for grading the surface of generally spherical fruit, comprising:

conveyor means for advancing a succession of generally spherical fruit along an axis;

first camera means for repeatedly scanning the advancing fruit along a first scan axis transverse to the conveyor axis and for generating reflectivity data representing a first surface portion of each article of fruit;

second camera means for repeatedly scanning the advancing fruit along a second scan axis transverse to the conveyor axis, spaced from the first scan axis, and for generating reflectivity data representing a second surface portion of each article of fruit;

wherein the conveyor means includes means for rotating the advancing fruit about a horizontal axis transverse to the conveyor axis as the fruit are advanced past the first and second scar axes, such that the first and second surface portions of each article of fruit overlap each other and together include substantially the entire surface of each article of fruit; and selection means for combining the reflectivity data generated by the first and second camera means while discarding the duplicative portion of the data that represents the overlap of the first and second surface portions, to provide a set of reflectivity data for substantially the entire surface of each fruit.

4. Apparatus as defined in claim 3, wherein:

the successive articles of fruit have a variable average diameter; and the selection means includes means for determining the approximate diameter of each article of fruit and for determining the duplicative portion of the combined reflectivity data to be discarded in accordance with the diameter determination.

5. Apparatus as defined in claim 4, wherein:

the conveyor means includes a succession of transverse rollers defining pockets therebetween, with a separate article of fruit being carried in each pocket; and each roller of the conveyor means has a circular cross-section with a diameter that varies in discrete steps along its length, such that the article of fruit carried in each pocket is supported by portions of the two adjacent rollers that are determined by the article's average diameter

6. Apparatus as defined in claim 3, wherein:

the reflectivity data generated by the first and second camera means represent the reflectivity of the fruit's outer surface in three or more wavelength bands for each of a plurality of distinct areas on the surface; and the apparatus further includes ratio means for computing two reflectivity ratios for each of the plurality of distinct areas on the fruit's surface, each reflectivity ratio representing a ratio of two different reflectivity measurements for the distinct area, and color grading means for assigning a color grade to each of the plurality of distinct areas on the fruit's surface based on both reflectivity ratios for that area and for combining the assigned color grades for all of the distinct areas so as to provide an overall color grading for the fruit's surface.

7. Apparatus for grading fruit according to the reflectivity of its outer surface, comprising:

camera means for scanning the fruit's outer surface to produce reflectivity measurements in three or more wavelength bands for each of a plurality of distinct areas on the surface;

ratio means for computing two reflectivity ratios for each of the plurality of distinct areas on the fruit's surface, each reflectivity ratio representing a ratio of two different reflectivity measurements for the distinct area; and color grading means for assigning a color grade to each of the plurality of distinct areas on the fruit's surface based on both reflectivity ratios for that area and for combining the assigned color grades for all of the distinct areas so as to provide an overall color grading for the fruit's surface.

8. Apparatus as defined in claim 7, wherein:

the camera means produces reflectivity measurements in red, near-infrared and green wavelength bands; and the reflectivity ratios computed by the ratio means include a ratio of green and red reflectivity measurements and a ratio of green and near-infrared reflectivity measurements.

9. Apparatus as defined in claim 7, wherein the plurality of distinct areas scanned by the camera means together cover substantially the entire outer surface of the fruit.

10. Apparatus as defined in claim 7, wherein the camera means scans the fruit's outer surface in a series of substantially parallel scan rows, with reflectivity measurements being produced for just a single wavelength band for each scan row; and the reflectivity measurements for each adjacent area on the fruit's outer surface are derived from three or more adjacent scan rows.

11. Apparatus as defined in claim 10, wherein the camera means includes:

photodetector means for receiving light reflected from a narrow band of the fruit's surface having a width corresponding to a scan row;

a plurality of color filters; and means for moving the color filters individually between the fruit and the photodetector means such that a different color filter is positioned for each adjacent scan row.

12. Apparatus as defined in claim 10, wherein the camera means includes a linear photodetector array for receiving light reflected from a narrow band of the fruit's surface having a width corresponding to a scan row and for producing a plurality of reflectivity measurements for each scan row.

13. Apparatus for grading generally spherical fruit according to surface color, comprising:

conveyor means for advancing a succession of generally spherical fruit along a conveyor axis, the fruit having a variable average diameter;

a first linear photodetector array for repeatedly scanning the advancing fruit along a first scan axis transverse to the conveyor axis and for generating reflectivity data representing a first surface portion of each article of fruit;

a second linear photodetector array for repeatedly scanning the advancing fruit along a second scan axis transverse to the conveyor axis, spaced from the first scan axis, and for generating reflectivity data representing a second surface portion of each article of fruit;

a plurality of color filters;

means for moving the color filters individually between the fruit and the first and second photodetector arrays such that a different color filter is positioned for each adjacent scan row;

wherein the conveyor means includes means for rotating the advancing fruit about a horizontal axis transverse to the conveyor axis as the fruit are advanced past the first and second scan axes, such that the first and second surface portions of each article of fruit overlap each other and together include substantially the entire surface of each article of fruit;

wherein the reflectivity measurements generated by the first and second photodetector arrays represent the reflectivity in three or more wavelength bands for each of a plurality of distinct areas on the surface;

selection means for combining the reflectivity data generated by the first and second camera means while discarding the duplicative portion of the data that represents the overlap of the first and second surface portions, to provide a set of reflectivity data for substantially the entire surface of each fruit, wherein the selection means includes means for determining the approximate diameter of each article of fruit and for determining the duplicative portion of the combined reflectivity data to be discarded in accordance with the diameter determination;

ratio means for computing two reflectivity ratios for each of the plurality of distinct areas on the fruit's surface, each reflectivity ratio representing a ratio of two different reflectivity measurements for the distinct area; and color grading means for assigning a color grade to each of the plurality of distinct areas on the fruit's surface based on both reflectivity ratios for that area and for combining the assigned color grades for all of the distinct areas so as to provide an overall color grading for the fruit's surface.

14. A method for grading the surface of generally spherical fruit, comprising steps of:

advancing a succession of generally spherical fruit along a fruit advancement axis, the fruit having variable average diameters;

optically scanning the advancing fruit repeatedly along a scan axis transverse to the conveyor axis and generating surface reflectivity data for each article of fruit;

rotating the advancing fruit about a horizontal axis transverse to the fruit advancement axis as the fruit are scanned, such that the surface reflectivity data represents substantially the entire surface of each article of fruit; and determining the approximate diameter of each article of fruit and, based on that determination, ascertaining what portion, if any, of the surface reflectivity data is duplicative of other surface reflectivity data and discarding that duplicative data, with the remaining surface reflectivity data representing substantially the entire surface of the article of fruit.

15. A method as defined in claim 14, wherein:

the step of optically scanning includes steps of repeatedly scanning the advancing fruit using a first linear photodetector array oriented along a first scan axis transverse to the fruit advancement axis and generating reflectivity data for a first surface portion of each article of fruit, and repeatedly scanning the advancing fruit using a second linear photodetector array oriented along a second scan axis transverse to the fruit advancement axis, spaced from the first scan axis, and generating reflectivity data •for a second surface portion of each article of fruit, wherein the first and second surface portions of each article of fruit overlap each other and together include substantially the entire surface of each article of fruit; and

16. A method for grading the surface of generally spherical fruit, comprising steps of:

advancing a succession of generally spherical fruit along a fruit advancement axis;

repeatedly scanning the advancing fruit along a first scan axis transverse to the fruit advancement axis and generating reflectivity data representing a first surface portion of each article of fruit;

repeatedly scanning the advancing fruit along a second scan axis transverse to the fruit advancement axis, spaced from the first scan axis, and generating reflectivity data representing a second surface portion of each article of fruit;

rotating the advancing fruit about a horizontal axis transverse to the fruit advancement axis as the fruit are advanced past the first and second scan axes, such that the first and second surface portions of each article of fruit overlap each other and together include substantially the entire surface of each article of fruit; and combining the reflectivity data generated in the two steps of repeatedly scanning while discarding the duplicative portion of the data that represents the overlap of the first and second surface portions, to provide a set of reflectivity data for substantially the entire surface of each fruit.

17. A method as defined in claim 16, wherein:

the successive articles of fruit have a variable average diameter; and the step of combining includes a step of determining the approximate diameter of each article of fruit and determining the duplicative portion of the combined reflectivity data to be discarded in accordance with the diameter determination.

18. A method as defined in claim 16, wherein:

the reflectivity data generated in the two steps of repeatedly scanning represent the reflectivity of the fruit's outer surface in three or more wavelength bands for each of a plurality of distinct areas on the surface; and the method further includes steps of computing two reflectivity ratios for each of the plurality of distinct areas on the fruit's surface, each reflectivity ratio representing a ratio of two different reflectivity measurements for the distinct area, and assigning a color grade to each of the plurality of distinct areas on the fruit's surface based on both reflectivity ratios for that area, and combining the assigned color grades for all of the distinct areas so as to provide an overall color grading for the fruit's surface.

19. A method for grading fruit according to the reflectivity of its outer surface, comprising the steps of:

scanning the fruit's outer surface to produce reflectivity measurements in three or more wavelength bands for each of a plurality of distinct areas on the surface;

computing two reflectivity ratios for each of the plurality of distinct areas on the fruit's surface, each reflectivity ratio representing a ratio of two different reflectivity measurements for the distinct area; and assigning a color grade to each of the plurality of distinct areas on the fruit's surface based on both reflectivity ratios for that area and combining the assigned color grades for all of the distinct areas so as to provide an overall color grading for the fruit's surface.

20. A method as defined in claim 19, wherein:

the step of scanning produces reflectivity measurements in red, near-infrared and green wavelength bands; and the reflectivity ratios computed in the step of computing include a ratio of green and red reflectivity measurements and a ratio of green and near-infrared reflectivity measurements.

21. A method as defined in claim 19, wherein the plurality of distinct areas scanned in the step of scanning together cover substantially the entire outer surface of the fruit.

22. A method as defined in claim 19, wherein:

the step of scanning includes a step of scanning the fruit's outer surface in a series of substantially parallel scan rows, with reflectivity measurements being produced for just a single wavelength band for each scan row; and the reflectivity measurements for each adjacent area on the fruit's outer surface are derived from three or more adjacent scan rows.

23. A method as defined in claim 22, wherein the step of scanning includes steps of:

directing light reflected from a narrow band of the fruit's surface having a width corresponding to a scan row toward a linear photodetector array; and moving a plurality of color filters individually between the fruit and the photodetector array such that a different color filter is positioned for each adjacent scan row.

* * * * *